US010366417B2

(12) United States Patent
Barak et al.

(10) Patent No.: US 10,366,417 B2
(45) Date of Patent: Jul. 30, 2019

(54) DISCOUNT OFFER WITH TIME PERIOD DEFINED BY USER IMPRESSION

(71) Applicant: Facebook, Inc., Menlo Park, CA (US)

(72) Inventors: Dan Barak, Redwood City, CA (US); John Stephen Ketchpaw, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 180 days.

(21) Appl. No.: 15/433,895

(22) Filed: Feb. 15, 2017

(65) Prior Publication Data

US 2018/0232769 A1 Aug. 16, 2018

(51) Int. Cl.
*G06Q 30/00* (2012.01)
*G06Q 30/02* (2012.01)

(52) U.S. Cl.
CPC ..... *G06Q 30/0264* (2013.01); *G06Q 30/0235* (2013.01); *G06Q 30/0253* (2013.01)

(58) Field of Classification Search
CPC .............. G06Q 30/0264; G06Q 30/0235
USPC ........... 705/14.35, 14.51, 14.61, 14.73, 14.1, 705/14.39
See application file for complete search history.

(56) References Cited

U.S. PATENT DOCUMENTS

| | | | | |
|---|---|---|---|---|
| 9,179,256 B1 * | 11/2015 | Pietraniec | ............. | H04W 4/021 |
| 9,824,366 B2 * | 11/2017 | Skowronek | ............ | G06Q 30/02 |
| 10,096,043 B2 * | 10/2018 | Beck | .................. | G06Q 30/0267 |
| 2005/0075932 A1 * | 4/2005 | Mankoff | ................ | G06Q 10/10 |
| | | | | 705/14.35 |
| 2006/0178932 A1 * | 8/2006 | Lang | ...................... | G06Q 30/02 |
| | | | | 705/14.73 |
| 2008/0065490 A1 * | 3/2008 | Novick | .................. | G06Q 30/02 |
| | | | | 705/14.26 |
| 2011/0004516 A1 * | 1/2011 | Oved | ..................... | G06Q 30/02 |
| | | | | 705/14.39 |
| 2011/0112901 A1 * | 5/2011 | Fried | ...................... | G06Q 30/02 |
| | | | | 705/14.49 |
| 2011/0191181 A1 * | 8/2011 | Blackhurst | ......... | G06Q 30/0255 |
| | | | | 705/14.53 |
| 2011/0320956 A1 * | 12/2011 | Singh | ................. | G06Q 30/0241 |
| | | | | 715/747 |

(Continued)

OTHER PUBLICATIONS

Gunes, et al. "Facebook Tracking through Social Plug-Ins." Jun. 24, 2015 (Year: 2015).*

(Continued)

*Primary Examiner* — Luis A Brown
(74) *Attorney, Agent, or Firm* — Fenwick & West LLP

(57) ABSTRACT

An online system receives a discount offer from a merchant and displays the offers to users. Some of the discount offers provide for a discount that becomes valid when the discount offer is displayed to the user and remains valid for an offer duration. To implement these discount offers, a timestamp representing the time at which the discount offer is displayed is recorded and encoded. The encoded timestamp is provided to the merchant system when the user makes a purchase. The merchant extracts the recorded timestamp from the encoded timestamp and compares the recorded timestamp to the time of the purchase. If the time elapsed between the timestamp and the purchase is less than the offer duration, then the merchant system applies the discount to the purchase.

20 Claims, 5 Drawing Sheets

(56) References Cited

U.S. PATENT DOCUMENTS

| | | | | |
|---|---|---|---|---|
| 2012/0036015 A1* | 2/2012 | Sheikh | G06Q 30/02 | 705/14.54 |
| 2012/0095823 A1* | 4/2012 | Tak | G06Q 10/087 | 705/14.38 |
| 2012/0303430 A1* | 11/2012 | Tiku | G06Q 30/0207 | 705/14.17 |
| 2013/0054369 A1* | 2/2013 | Grigg | G06Q 30/02 | 705/14.58 |
| 2013/0159081 A1* | 6/2013 | Shastry | G06Q 30/0274 | 705/14.23 |
| 2014/0058815 A1* | 2/2014 | Hiremath | G06Q 30/0215 | 705/14.17 |
| 2014/0180817 A1* | 6/2014 | Zilkha | G06Q 30/02 | 705/14.55 |
| 2014/0242904 A1* | 8/2014 | Pandey | H04B 7/24 | 455/39 |
| 2014/0257956 A1* | 9/2014 | Durbha | G06Q 30/0225 | 705/14.23 |
| 2014/0365304 A1* | 12/2014 | Showers | G06Q 30/02 | 705/14.55 |
| 2015/0081457 A1* | 3/2015 | Agnes | G06Q 30/0601 | 705/14.73 |
| 2015/0082212 A1* | 3/2015 | Sharda | H04L 67/26 | 715/764 |
| 2015/0112778 A1* | 4/2015 | Feldman | G06Q 30/0214 | 705/14.16 |
| 2015/0112790 A1* | 4/2015 | Wolinsky | G06Q 30/0238 | 705/14.38 |
| 2015/0120411 A1* | 4/2015 | Kneen | G06Q 30/0211 | 705/14.13 |
| 2015/0134436 A1* | 5/2015 | Lambert | G06Q 30/00 | 705/14.26 |
| 2015/0142594 A1* | 5/2015 | Lutnick | G06Q 20/202 | 705/21 |
| 2015/0161643 A1* | 6/2015 | Randell | H04W 4/21 | 705/14.26 |
| 2015/0186869 A1* | 7/2015 | Winters | G06Q 20/3255 | 705/26.81 |
| 2015/0221016 A1* | 8/2015 | Schulz | G06Q 30/0633 | 705/26.7 |
| 2015/0242837 A1* | 8/2015 | Yarbrough | G06Q 20/327 | 705/44 |
| 2015/0254704 A1* | 9/2015 | Kothe | G06Q 30/06 | 705/14.26 |
| 2015/0287077 A1* | 10/2015 | Celikyilmaz | G06Q 30/0253 | 705/14.51 |
| 2015/0324846 A1* | 11/2015 | Feldman | G06Q 30/0256 | 705/14.54 |
| 2016/0019572 A1* | 1/2016 | Ekselius | G06Q 30/0211 | 705/14.13 |
| 2016/0034935 A1* | 2/2016 | Neb | G06Q 30/0214 | 705/14.16 |
| 2016/0034974 A1* | 2/2016 | Neb | G06Q 30/0276 | 705/14.16 |
| 2016/0149919 A1* | 5/2016 | Gauthier | H04L 63/10 | 726/7 |
| 2016/0180396 A1* | 6/2016 | Devolites | G06Q 30/0267 | 705/14.56 |
| 2016/0203506 A1* | 7/2016 | Butler, IV | G06Q 30/0222 | 705/14.23 |
| 2016/0204879 A1* | 7/2016 | Niewczas | H04B 11/00 | 455/41.1 |
| 2016/0225006 A1* | 8/2016 | Chen | G06F 16/9535 | |
| 2016/0234647 A1* | 8/2016 | MacDonald | H04W 4/027 | |
| 2016/0262191 A1* | 9/2016 | Flynn | H04W 76/10 | |
| 2016/0267509 A1* | 9/2016 | Grosso | G06Q 30/0206 | |
| 2016/0314487 A1* | 10/2016 | Martin | G06Q 30/0215 | |
| 2017/0221086 A1* | 8/2017 | Zhou | G06Q 30/0211 | |
| 2017/0237736 A1* | 8/2017 | Eber | H04L 63/10 | 726/4 |
| 2018/0063684 A1* | 3/2018 | Cheng | H04W 4/21 | |
| 2018/0109909 A1* | 4/2018 | Banerjee | H04W 4/02 | |
| 2018/0232768 A1* | 8/2018 | Barak | G06Q 30/0235 | |
| 2018/0232769 A1* | 8/2018 | Barak | G06Q 30/0235 | |

OTHER PUBLICATIONS

Sath, Arvind. "Engaging Customers using Big Data." New York: Palgrave Macmillan, 2014, pp. 131-157. (Year: 2014).*

* cited by examiner

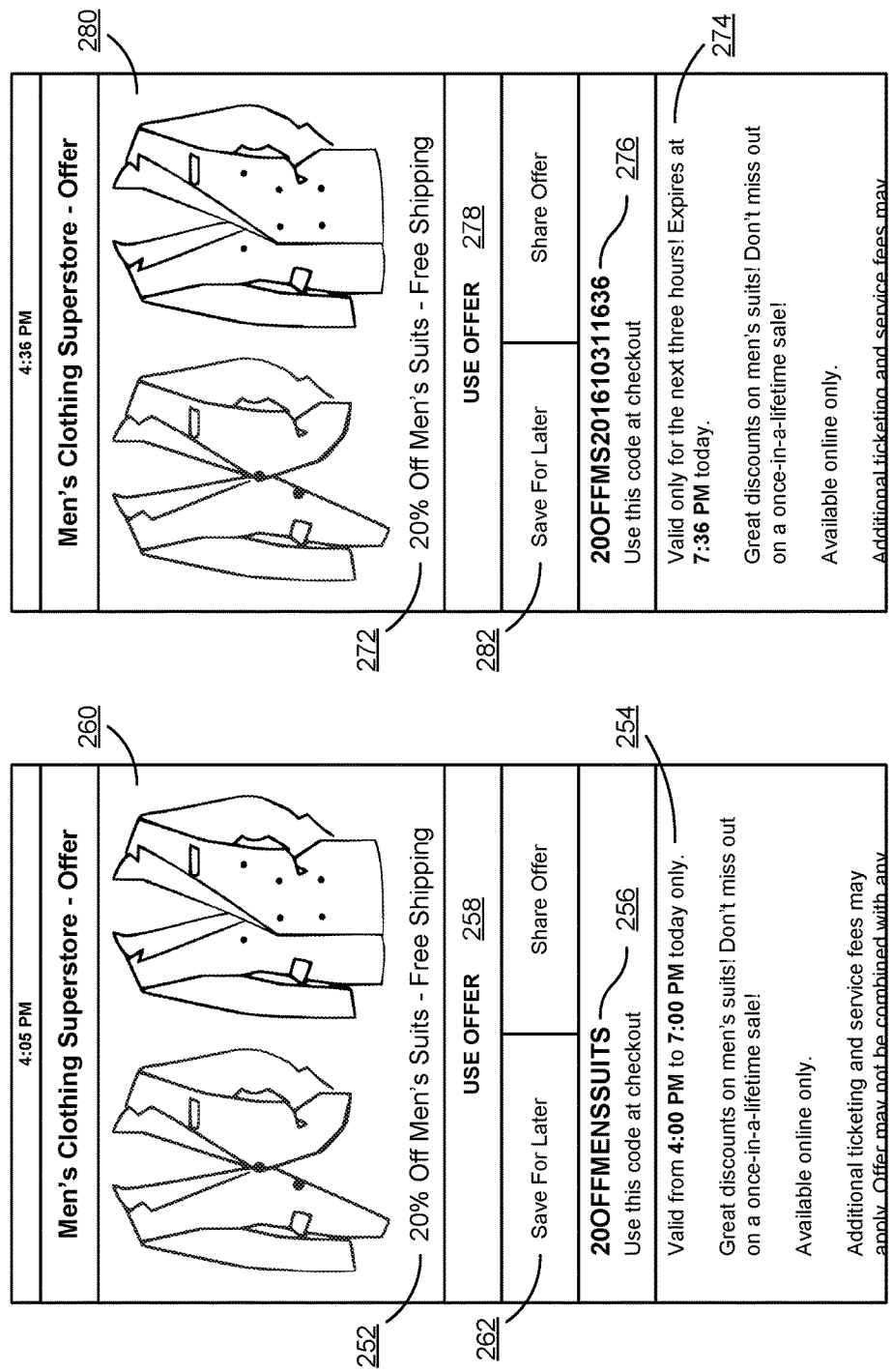

DISCOUNT OFFER WITH TIME PERIOD DEFINED BY USER IMPRESSION

BACKGROUND

This invention relates generally to providing discount offers on an online system, and more specifically to providing an offer for a discount that becomes valid at the time it is displayed to a user.

Many online systems display content from third-party merchants alongside content that was generated on the online system. Displaying merchant content on an online system gives rise to several benefits for the merchants, the users of the online system, and the online system itself. For instance, it gives a merchant a platform to promote itself or its products and possibly increase its sales as a result, it provides an additional source of content that users of the online system may find interesting, and it may provide a revenue stream for the online system.

Ordinarily, the merchant content that is displayed on an online system simply includes graphics or text promoting the merchant. Conventional merchant content provides no opportunities for users to engage with the merchant and often fails to provide a compelling reason for a user to purchase something with the merchant. As a result, many users simply scroll past merchant content without paying much attention to it when it is displayed to them by the online system.

SUMMARY

An online system receives discount offers from merchants and displays those discount offers to users. A discount offer is a content item provided by a merchant that offers a user a discount that is valid for a limited time period. The user can redeem the discount by completing a purchase with the merchant while the discount is valid. Because a discount offer presents the user with an opportunity to save money on a purchase with the merchant, a discount offer gives the user a stronger incentive to view products that can be purchased from the merchant and to follow through with a purchase.

Some of the discount offers are variable-start discount offers, which provide for a discount that becomes valid when the discount offer is displayed to the user and remains valid for a certain length of time (the offer duration). To implement these variable-start discount offers, a timestamp representing the time at which the variable-start discount offer is displayed is recorded, and the recorded timestamp is encoded into an encoded timestamp. The encoded timestamp is provided to the merchant system when the user makes a purchase. For example, the encoded timestamp may be a discount code with the timestamp encoded into it, or a digitally signed URL which has the timestamp encoded into it and which points to the merchant's website. The merchant extracts the recorded timestamp from the encoded timestamp and compares the recorded timestamp to the time of the purchase. If the time elapsed between the timestamp and the purchase is less than the offer duration, then the merchant system applies the discount to the purchase.

BRIEF DESCRIPTION OF THE DRAWINGS (BOTH APPLICATIONS)

FIG. 2B is an illustration of a first type of discount offer, in accordance with an embodiment of the invention.

FIG. 2C is an illustration of a second type of discount offer, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION (BOTH APPLICATIONS)

System Architecture

Figure 1:
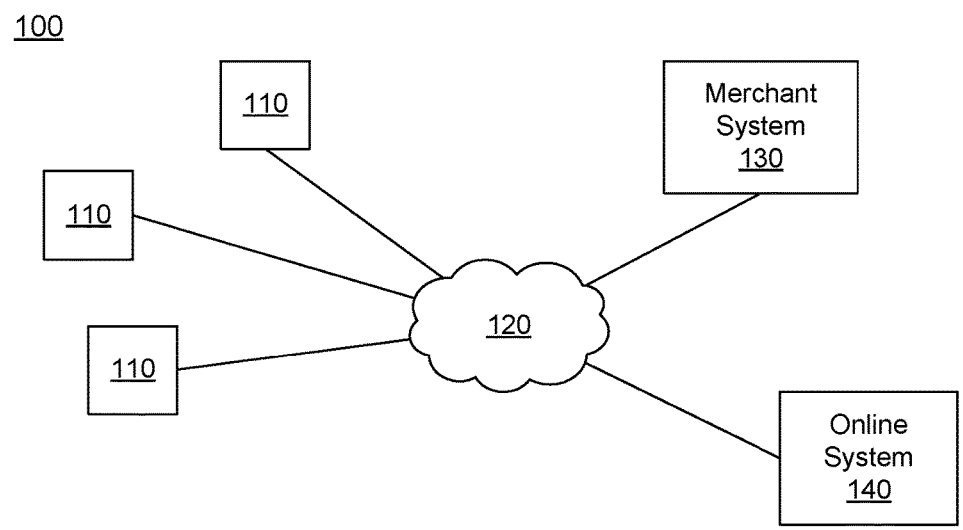
FIG. 1 is a block diagram of a system environment in which an online system operates, in accordance with an embodiment of the invention.

FIG. 1 is a high level block diagram of a system environment 100 for an online system 140. The system environment 100 shown by FIG. 1 comprises one or more client devices 110, a network 120, one or more merchant systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, LTE, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more merchant systems 130 may be coupled to the network 120 for communicating with the client devices 110 and the online system 140, which is further described below in conjunction with FIG. 2A. In one embodiment, a merchant system 130 is a system that facilitates online purchases. For instance, the merchant system 130 performs tasks such as providing a web site (or a dedicated application executing on a client device 110) that displays products for sale and provides an interface for purchasing those products online, tracking inventory for products, and generating discount offers that allow customers to redeem discounts on purchases made through the merchant system 130. As referred to herein, the products that can be purchased through a merchant system 130 can include any sort of goods or services, including physical goods (e.g., clothing, shoes, electronics), digital goods (e.g., downloadable software applications, application-specific purchases such as in-game currency or access to paid features in an otherwise free application), subscriptions (e.g., magazines and newspapers, access to subscription-based electronic services such as NETFLIX, AMAZON PRIME, and XBOX LIVE), and real-world services (e.g., music lessons, ridesharing services such as LYFT and UBER).

Figure 2A:
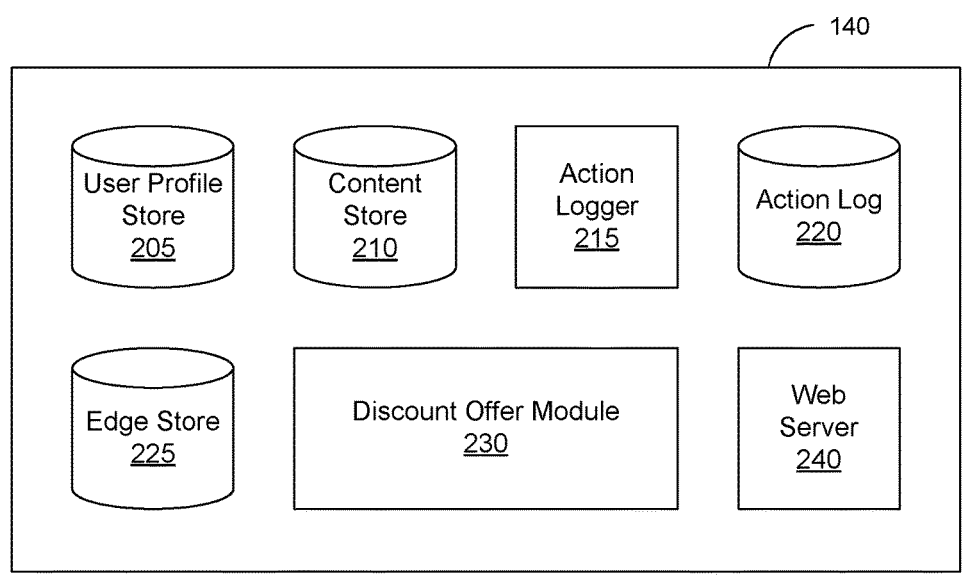
FIG. 2A is a block diagram of an online system, in accordance with an embodiment of the invention.

FIG. 2A is an example block diagram of an architecture of the online system 140. The online system 140 shown in FIG. 2A includes a user profile store 205, a content store 210, an action logger 215, an action log 220, an edge store 225, a discount offer module 230, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. For example, discount offers are received from a merchant system 130 and stored as objects in the content store 210. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on merchant systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a merchant system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a merchant system 130, including webpage viewing histories, advertisements that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system. Users and objects within the online system can represented as nodes in a social graph that are connected by edges stored in the edge store.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The discount offer module 230 performs a variety of operations to manage discount offers. As referred to herein, a discount offer is a type of content item provided by a merchant that offers the user a discount that is valid for a limited time period. If a user makes a purchase from the merchant while the discount is valid, then the merchant applies the discount to the user's purchase. For example, an offer may give a user an opportunity to receive a 20% discount on the purchase of a new suit at a clothing retailer if the purchase is made during a particular long weekend. The discount offer module 230 receives discount offers from one or more merchant systems 130 and stores the discount offers as content items in the content store 210. When users access the online system 140, the module 230 selects discount offers to be displayed to users and sends the selected discount offers to those users for display on the users' client devices 110.

The discount offer module 230 may provide two different types of discount offers. Referring now to FIG. 2B, an example of a first type of discount offer is shown. The first type of discount offer is a fixed-start discount offer, which provides a discount that becomes valid at a fixed start time. In one embodiment, a fixed-start discount offer includes an offer start time and an offer end time, and the discount is valid between the offer start time and the offer end time. For example, a fixed-start discount offer shown in FIG. 2B provides a 20% discount on men's suits 252, and the offer states that the discount is valid from 4:00 PM to 7:00 PM on the day it is being displayed 254. In another embodiment, a fixed-start discount offer includes an offer start time and an offer duration, and the discount becomes valid at the offer start time and remains valid for the offer duration. For example, a fixed-start discount offer provides a discount that becomes valid at 5:30 PM on a particular date and remains valid for the next two hours. In still another embodiment, a fixed-start discount offer provides a discount that becomes valid upon the occurrence of some sort of external triggering event or a fixed period of time after the occurrence of a triggering event (e.g., a discount becomes valid one hour after the end of the Super Bowl) and remains valid for an offer duration. A fixed-start discount offer also includes a discount code, such as the code 20OFFMENSSUITS 256 shown in FIG. 2B. If provided to the merchant system 130 while the discount is valid, the discount code causes the merchant system 130 to apply the discount to a purchase.

After a discount offer is displayed to a user, the user can interact with the discount offer in a variety of ways. For example, the discount offer includes a uniform resource locator (URL) for the merchant website where the offer can be redeemed. Thus, if the discount offer is displayed to the user while the discount is valid, the user can select the URL (e.g., by selecting a "USE OFFER" button 258 displayed as part of the discount offer, as shown in FIG. 2B, or by selecting a promotional graphic displayed with the offer, such as the graphic of two suits 260 shown in FIG. 2B) to easily view the merchant's website, make a purchase from the merchant, and redeem the discount. In one embodiment, the discount offer 230 also provides users with an option to save a discount offer for later. In the example shown in FIG. 2B, a "save for later" button 262 is displayed as part of the discount offer. If the user selects the "save offer" button, the module 230 creates an edge connecting the user's profile with the content object representing the discount offer and stores the edge in the edge store 225. The user can later navigate to a "saved offers" interface provided by the online system 140 to view discount offers that the user has previously saved.

In some embodiments, the discount offer module 230 sends notifications about discount offers upon detecting that certain events have occurred. For example, a discount offer for a purchase from a particular merchant is displayed to a user before the offer becomes valid. If the discount offer module 230 detects that the user has viewed a web page operated by the same merchant after the discount offer was displayed to the user, then the module 230 may send a notification about the discount offer to the user. Sending a notification in this manner is beneficial because it has the effect of reminding the user about the discount offer after the user has already expressed an interest in the merchant by visiting the merchant's website. As another example, if a discount offer is first displayed to a user when the user is accessing the online system 140 on a smartphone or other mobile device (i.e., a device running a mobile operating system), the module 230 may send a notification about the discount offer after detecting that the user has begun interacting with the online system 140 on a conventional computer system, such as desktop or laptop computer. This is advantageous because some users may prefer to conduct online commerce activities on a desktop or laptop computer (e.g., because such computers include a larger display that allows the user to view several products at once). As still another example, the user saves a discount offer for later, and the discount offer module 230 sends the user a notification at a fixed time before the discount becomes invalid (e.g., 30 minutes before the discount becomes invalid) to remind the user that the discount is about to expire.

Referring now to FIG. 2C, a second type of discount offer is shown. The second type of discount offer is a variable-start discount offer, which provides a discount that becomes valid for a particular user as soon as the discount offer is displayed to the user and that remains valid for a fixed time period. A variable-start discount offer includes an offer duration. For example, the variable-start discount offer shown in FIG. 2C provides a similar 20% discount off men's suits 272, but the discount shown in FIG. 2C becomes valid once it is displayed and remains valid for the following three hours. The discount offer shown in FIG. 2C was displayed on the user's client device 110 at 4:36 PM, so it contains a statement 274 informing the user that it will be valid until 7:36 PM. Similar to a fixed-start discount offer, a variable-start discount offer also includes a URL (which can be selected by selecting the "use offer" button 278 or the promotional graphic 280 displayed with the discount offer) and a "save for later" button 282 that allows the user to save the discount offer for later.

When the module 230 selects a variable-start discount offer to be displayed to a user, the module 230 records a timestamp representing the date and time at which the discount offer becomes valid. The module 230 encodes the timestamp to generate an encoded timestamp and provides the encoded timestamp for delivery to the merchant system 130 (e.g., by sending the encoded timestamp to the user, who in turn provides the encoded timestamp to the merchant system 130 when making a purchase, or by sending the encoded timestamp directly to the merchant system 130). In one embodiment, the encoded timestamp is a user-specific discount code that has the timestamp encoded into it. For example, the user-specific discount code 276 shown in FIG. 2C has encoded into it a timestamp indicating that the offer becomes valid at 4:36 PM on Oct. 31, 2016. By encoding the timestamp into a user-specific discount code in this manner, the merchant system 130 can determine the amount of time that has elapsed between the timestamp and the time at which the purchase is being made. The merchant system 130 can then compare the elapsed time to the offer duration to determine whether the purchase is being made while the discount is still valid.

Referring back to FIG. 2A, the web server 240 links the online system 140 via the network 120 to the one or more client devices 110, as well as to the one or more merchant systems 130. The web server 140 serves web pages, as well as other web-related content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or RIM®.

Sending Notifications of Pre-Announced Discount Offers

Figure 3:
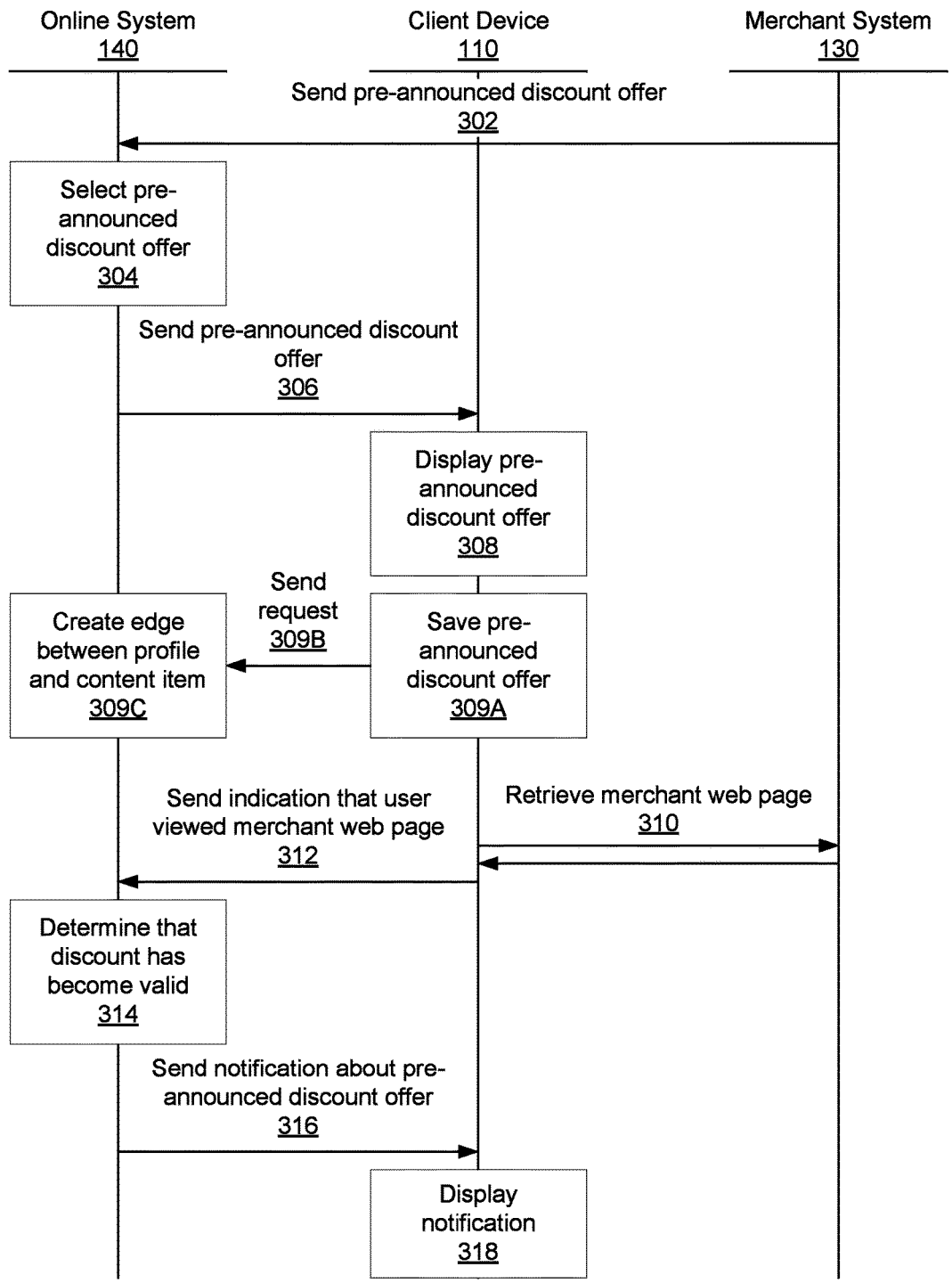
FIG. 3 is an interaction diagram illustrating a method for sending a user a notification of a pre-announced discount offer, in accordance with an embodiment of the invention.

FIG. 3 is an interaction diagram illustrating a method for sending a user a notification of a pre-announced discount offer. In other embodiments, the method may include different and/or additional steps than those shown in FIG. 3. Additionally, steps of the method may be performed in different orders than the order described in conjunction with FIG. 3 in various embodiments.

As referred to herein, a pre-announced discount offer is a fixed-start discount offer that the discount offer module 230 begins displaying to users of the online system 140 before the discount offer's start time. Thus, the discount offer is "pre-announced" because users are shown an offer for a discount that is currently invalid but will become valid in the future.

The merchant system 130 sends 302 a pre-announced discount offer to the online system 140, and the discount offer module 230 stores the pre-announced discount offer in the content store 210. Because a pre-announced discount offer is a type of fixed-start offer, the pre-announced offer includes the elements of the fixed-start discount offer that are described above with reference to FIG. 2B. In particular, a pre-announced discount offer includes an offer start time, an offer end time (or an offer duration), and a discount code. A pre-announced discount offer may also include promotional graphics and text to be displayed with the offer, and it may further include the terms and conditions of the discount being offered, such as the amount of the discount (e.g., a percentage or a dollar amount), the subject matter of the discount (e.g., the discount is for men's suits), and limitations on the discount (e.g., the discount may not be combined with other discounts or promotions).

Prior to the offer start time, the discount offer module 230 selects 304 the pre-announced discount offer for display to a user. The selection 304 of the pre-announced discount offer can be performed in response to the user accessing the online system 140. For example, when the user logs on to the online system 140 through a web browser application or dedicated application on a client device 110, the client device 110 automatically requests a certain number of items to populate different portions of the online system's user interface (e.g., a newsfeed, a sidebar, etc.), and the pre-announced discount offer is selected 304 as one of the items to be displayed in the user interface.

The online system 140 sends 306 the pre-announced discount offer to the user's client device 110, and the client device 110 displays 308 the pre-announced discount offer to the user. Because the pre-announced discount offer is displayed to the user before the offer start time, the discount is not yet valid at the time the pre-announced discount offer is displayed. Thus, the user cannot yet use the discount. For example, the pre-announced discount offer is displayed without the discount code 256 shown in FIG. 2B. Alternatively, the pre-announced discount offer is displayed with the discount code 256, but the merchant system 130 does not allow the discount code to be redeemed before the discount becomes valid. As another example, the pre-announced discount offer is displayed to the user without the "use offer" button 258 shown in FIG. 2B. In these examples, the "save for later" button 262 may still be displayed. If the user selects the option to save 309A the pre-announced discount offer for later, the client device 110 sends 309B a request to the online system 140 to save the pre-announced discount offer for later. In response to receiving the request, the discount offer module 230 creates 309C an edge between the user's profile and the content item representing the pre-announced discount offer.

After the discount offer is displayed 308 to the user, the discount offer module 230 can send 316 the user a notification about the offer after the module 230 detects a triggering condition. The notification has the function of reminding the user about the pre-announced discount offer. In one embodiment, the discount offer module 230 only sends notifications for pre-announced discount offers that the user has saved (i.e., pre-announced discount offers that are connected to the user's profile via an edge). In another embodiment, the discount offer module 230 can send notifications for any pre-announced discount offer that has previously been displayed to the user, regardless of whether the user saved the pre-announced discount offer.

Steps 310, 312, and 314 of FIG. 3 illustrate one example of a triggering condition. Specifically, these steps 310, 312, 314 illustrate a triggering condition that causes the discount offer module 230 to send a notification upon detecting that the user has viewed a web page provided by the merchant system. At some point after the client device 110 displays 308 the discount offer to the user, the user uses the client device 110 (or another client device 110 associated with the user) to view a web page provided by the merchant system 130, and this causes the client device 110 to retrieve 310 the web page. For example, the user visits the merchant's website to view products offered by the merchant or to view other information about the merchant.

The merchant web page is configured so that displaying the merchant web page on a client device 110 causes the client device 110 to send 312 an indication to the online system 140 that the user has viewed the merchant web page. For example, the merchant web page contains a web beacon or tracking pixel (also known as a page tag, pixel tag, or clear GIF) for the online system 140, and when a web browser application on the client device 110 displays the web page, the web beacon causes the web browser application to request data from the online system 140. In one embodiment, the request identifies the user, which allows the online system 140 to determine that the user has viewed the merchant web page.

After the discount offer module 230 determines 314 that the discount has become valid (e.g., the offer start time has passed), the module 230 sends 316 a notification to the client device 110 to remind the user of the pre-announced discount offer, and the client device 110 displays 318 the notification to the user. In one embodiment, the notification includes the identity of the merchant. For example, the notification may inform the user that, "An offer from Men's Clothing Superstore is valid right now!" The notification may also include other information about the discount, such as the offer end time, the amount of time remaining before the discount becomes invalid, the amount of the discount, and the subject matter of the discount. In still another embodiment, the notification simply states that the user has a pre-announced discount offer that is currently valid without any other information about the discount.

Although the interaction diagram shown in FIG. 3 indicates that the user retrieves 312 and views the merchant web page before the discount becomes valid 314, the timing of these two events as shown in FIG. 3 is merely exemplary. In another embodiment, the user may additionally or alternatively view the merchant web page after the discount becomes valid, and the discount offer module 230 may still send 316 the notification as long as the discount is still valid at the time the notification is sent. In still another embodiment, the discount offer module 230 may send the notification 316 after receiving the indication but before determining 314 that the discount has become valid.

In some embodiments, the discount offer module 230 enforces a minimum time delay between the time at which the online system 140 receives 312 the indication that the user viewed the merchant web page and the time at which the discount offer module 230 sends 316 the notification reminding the user about the merchant's pre-announced discount offer. For example, the minimum time delay is 30 minutes, so the discount offer module 230 withholds the notification for at least 30 minutes after receiving the indication.

Apart from the triggering condition described above, the discount offer module 230 can additionally or alternatively send 316 a notification after one or more other triggering conditions have been satisfied. In some embodiments, the module 230 defines one or more time-based triggering conditions. For example, the module 230 sends 316 the notification a fixed length of time before the offer start time, after the offer start time, or before the offer end time. As another example, the module 230 sends 316 the notification on a weekday after normal working hours (e.g., 9 AM to 5 PM) or on a weekend. In some embodiments, the module 230 defines one or more triggering conditions based on location, network connectivity, or characteristics of the client device 110. For example, the module 230 sends 316 the notification after determining that the user is at a particular location (e.g., a location corresponding to his or her place of residence), after determining that the user is using a client device 110 with a network connectivity speed faster than a threshold speed or with a network connection of a particular type (e.g., a client device connected via a Wi-Fi connection or an LTE connection), or after determining that the user is using a client device 110 with a display size larger than a threshold display size (e.g., a laptop or desktop computer rather than a mobile device) or a client device 110 with a desktop operating system (e.g., a device running APPLE MACOS or MICROSOFT WINDOWS rather than APPLE IOS or GOOGLE ANDROID). In various embodiments, the online system 140 provides privacy settings that allow the user to enable/disable the use of personal data (e.g., the user's location, network connectivity speed, and device characteristics) for the operation of these features.

This method of providing a notification of a merchant's currently-valid discount based on a triggering condition is advantageous because it provides the user with a reminder of the discount under conditions that increase the likelihood that the user will claim the discount by making a purchase with the merchant. First, the user has already viewed the pre-announced discount offer at least one time before the time of the notification, so the user is already aware that the discount exists. Second, because the user has viewed the merchant's website after viewing the pre-announced discount offer, it is likely that the user is at least somewhat interested in claiming the discount. Similarly, other triggering conditions also correspond to conditions that increase the likelihood that the user will claim the discount (e.g., sending the notification after normal working hours, while the user is at home, or while the user is operating a client device with a large screen, a desktop operating system, or a fast network connection). Third, if the notification is sent while the discount is valid, then the notification can inform the user that the user can claim the discount immediately.

Providing Discount Offers with Variable Start Times

Figure 4:
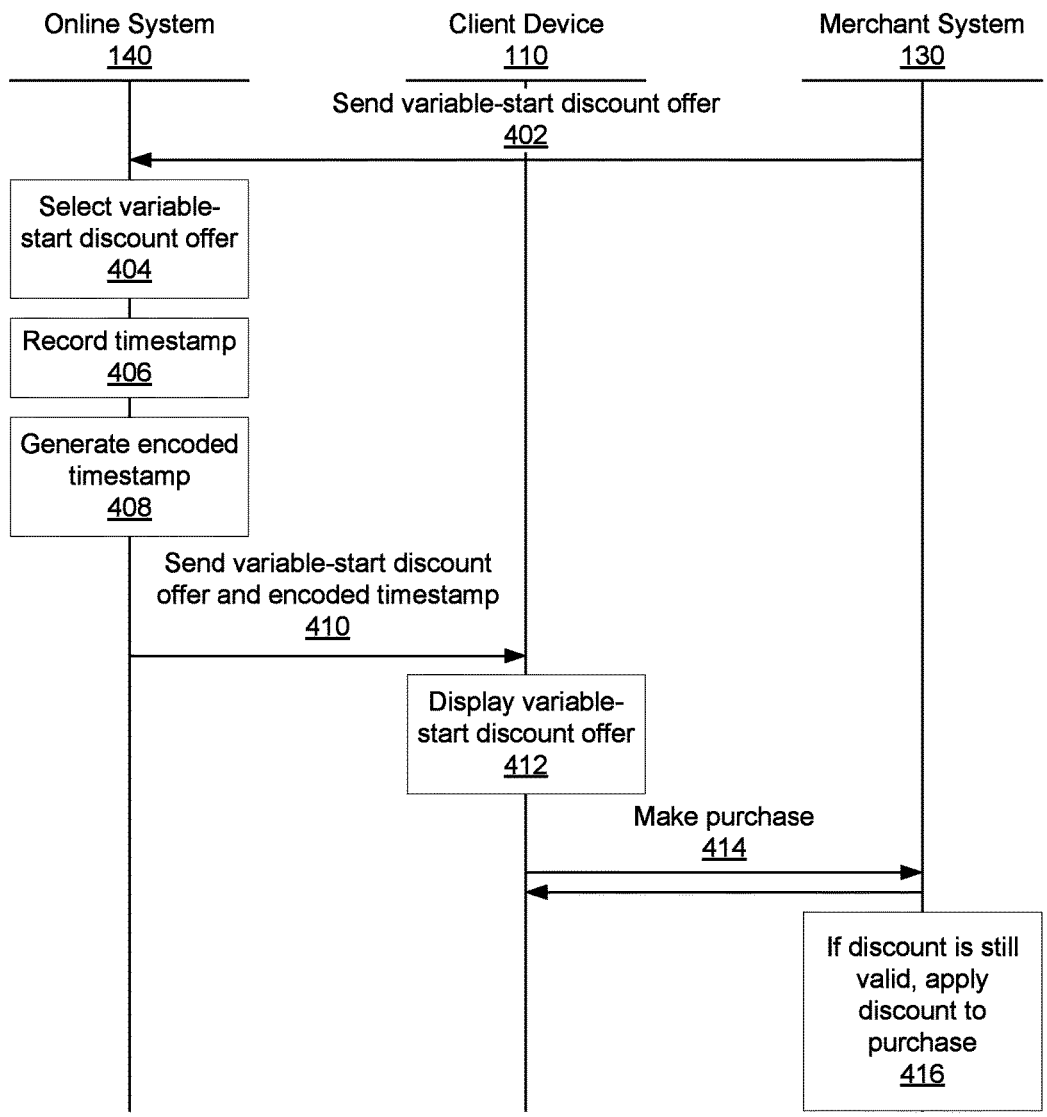
FIG. 4 is an interaction diagram illustrating a method for providing a variable-start discount offer with a start time defined by a user impression, in accordance with an embodiment of the invention.

FIG. 4 is an interaction diagram illustrating a method for providing a variable-start discount offer. In other embodiments, the method may include different and/or additional steps than those shown in FIG. 4. Additionally, steps of the method may be performed in different orders than the order described in conjunction with FIG. 4 in various embodiments.

The merchant system 130 sends 402 a variable-start discount offer to the online system 140, and the discount offer module 230 stores the variable-start discount offer in the content store. As noted above with reference to FIG. 2C, a variable-start discount offer includes an offer duration, and it offers the user a discount that becomes valid when displayed to the user and remains valid for the offer duration. Similar to a fixed-start discount offer, a variable-start discount offer may also include promotional graphics and text to be displayed with the offer, and it may further include the terms and conditions of the discount being offered, such as the amount of the discount (e.g., a percentage or a dollar amount), the subject matter of the discount (e.g., the discount is for men's suits), and limitations on the discount (e.g., the discount may not be combined with other discounts or promotions).

The discount offer module 230 selects 404 the variable-start discount offer for display to a user. As described above with reference to FIG. 3, the selection 404 of the offer can be performed in response to the user accessing the online system 140, which in turn causes the user's client device 110 to request one or more items from the online system 140 to populate a user interface of the online system. The module 230 may select the variable-start discount offer as one of the items.

The discount offer module 230 records 406 a timestamp representing the time at which the variable-start discount offer is displayed to the user and encodes the recorded timestamp to generate 408 an encoded timestamp. In the embodiment shown in FIG. 4, the module 230 records 206 the timestamp in response to the variable-start discount offer being selected 404 for display and before the variable-start discount offer is sent 410 to the client device 110 to be displayed. In this embodiment, it is assumed that the steps of generating 408 the encoded timestamp and sending 410 the variable-start discount offer for display to the user take a relatively small amount of time (e.g., less than a few seconds), so recording the timestamp before these steps 408, 410 are performed still yields a sufficiently accurate representation of the time at which the variable-start discount offer is displayed.

The encoded timestamp has a format that is capable of being decoded by the merchant system 130 to recreate the recorded, unencoded timestamp. In one embodiment, the encoded timestamp is a user-specific discount code with the timestamp encoded into it. In this embodiment, the user-specific discount code may additionally include other information that would otherwise be included in an ordinary discount code, such as the amount and subject matter of the discount. An example of a user-specific discount code with a timestamp representing 4:36 PM on Oct. 31, 2016 is shown in FIG. 2C. The example discount code shown in FIG. 2C is merely exemplary; in other embodiments, the timestamp is encoded into the user-specific coupon code in a manner that obscures the value of the timestamp, which makes it more difficult for unauthorized third parties to generate user-specific coupon codes in the same format.

In another embodiment, the discount offer module 230 generates the encoded timestamp by digitally signing a uniform resource locator (URL) that points to a website provided by the merchant system 130. In this embodiment, the URL includes a digital signature that allows the merchant system 130 to verify that the URL was generated by the online system 130 and not by an unauthorized third party. The URL additionally includes a representation of the recorded timestamp that the merchant system 130 can extract from the URL.

The discount offer module 230 sends 410 both the variable-start discount offer and the encoded timestamp to the client device 110, and the client device 110 displays 412 the variable-start discount offer in a manner that incorporates the encoded timestamp. For example, if the encoded timestamp is a user-specific discount code, the user-specific discount code may be shown as part of the variable-start discount offer (as shown in the example in FIG. 2C). As another example, if the encoded timestamp is a signed URL, the variable-start discount offer may be displayed so that selecting the discount offer's promotional graphic or the "get offer" button causes the signed URL to be opened in a web browsing window.

The variable-start discount offer may be displayed with a message informing the user that the discount is currently valid and becomes invalid after the offer duration has elapsed. For example, the variable-start discount offer is displayed with a message stating, "Valid only for the next three hours," as shown in the example in FIG. 2C. To further convey a sense of urgency, the variable-start discount offer may additionally or alternatively be displayed with a countdown timer that displays the time remaining before the discount becomes invalid.

In another embodiment, the module 230 sends 410 the variable-start discount offer to the client device before recording 406 the timestamp and generating 408 the encoded timestamp. In this embodiment, the client device 110 displays 412 the variable-start discount offer without incorporating the encoded timestamp. For example, the encoded timestamp is a user-specific discount code. In this example, the variable-start discount offer is displayed without a discount code, but the user can select the "use offer" button to send a request to the online system 140 for an encoded timestamp. In response to receiving the request, the online system records 406 a timestamp, generates 408 an encoded timestamp (i.e., a user-specific discount code), and sends the discount code to the client device 110 so that the client device can display the code as part of the offer. As another example, the encoded timestamp is a digitally signed URL. In this example, selecting the "use offer" button causes the client device 110 to send a request to the online system 140 for an encoded timestamp. In response to receiving the request, the online system 140 performs the same steps of recording 406 a timestamp, generating 408 an encoded timestamp (i.e., a digitally signed URL), and sending the URL to the client device 110. Upon receiving the URL, the client device 110 opens the URL in a web browsing window.

After the variable-start discount offer is displayed 412 to the user, the user uses the client device 110 to make a purchase 414 at the merchant system 130, and the client device 110 sends the encoded timestamp to the merchant system 130 as part of the process for making the purchase 414. For example, the encoded timestamp is a user-specific discount code, and the user provides the discount code on a checkout page when making the purchase 414. As another example, the encoded timestamp is a signed URL, and the merchant system 130 receives information in the signed URL when user uses the signed URL to navigate to the merchant's website.

The merchant system 130 decodes the encoded timestamp to extract the recorded timestamp and determines whether the purchase is being made 414 while the discount is valid. Specifically, the merchant system compares the recorded timestamp to the current time to determine how much time has elapsed between the timestamp (which represents time the offer was displayed) and the present time. Next, the merchant system compares the elapsed time to the offer duration. If the elapsed time is less than the offer duration, then the discount is still valid, and the merchant system 130 applies 416 the discount to the purchase.

In an alternative embodiment, the client device 110 records the timestamp locally and sends the recorded timestamp to the online system 140 as part of a request for an encoded timestamp. In response to receiving the request, the online system 140 generates the encoded timestamp and sends the encoded timestamp to the client device 110. This embodiment is advantageous because recording the timestamp on the client device 110 allows the timestamp to be recorded contemporaneously with the display of the variable-start discount offer, which yields a more accurate representation of the time at which the variable-start discount offer was displayed. In another alternative embodiment, the client 110 records the timestamp and also generates the encoded timestamp. This reduces the communication between the client device 110 and the online system 140 and may allow for less lag between the time the timestamp is recorded and the time the encoded timestamp is available on the client device 110.

In still another alternative embodiment, the online system 140 sends the encoded timestamp directly to the merchant system 130 instead of sending it to the client device 110. In this embodiment, the online system 140 also sends an identifier for the user so that the merchant system 130 can associate the encoded timestamp with the user to whom the discount offer was displayed. For example, the online system 140 sends a hashed user identifier to the merchant system 130.

In still another alternative embodiment, the online system 140 (or the client device 110) records the timestamp and adds the offer duration to the timestamp to determine an end time for the offer (i.e., the time at which the discount becomes invalid). In this embodiment, the offer end time, not the recorded timestamp, is used to generate the encoded timestamp, and the merchant system 130 determines whether the discount is valid at the time of purchase by comparing the purchase time with the offer end time (i.e., the discount is valid if the purchase time is before the offer end time, and the discount is invalid if the purchase time is after the offer end time).

In some embodiments, the discount offer module 230 provides a notification to remind the user of the variable-start discount offer if the discount is still valid but the user has not yet redeemed the discount. For example, the module 230 provides a notification about the variable-start discount offer if the user has not redeemed the discount 30 minutes before the discount is set to become invalid. In embodiments where the discount offer module 230 provides the ability to save a variable-start discount offer for later, the discount offer module 230 may provide notifications for variable-start discount offers that the user has saved, but it does not provide notifications for other variable-start discount offers that have been displayed to the user.

This method allows an online system to offer a discount that becomes valid at the time it is displayed to a user, which is advantageous because a discount that becomes valid in this manner can convey a stronger sense of urgency to the user, which in turn increases the likelihood that the user will redeem the discount by completing a purchase at the merchant system 130 while the discount is valid.

Although this method was only described with reference to a single user, the method can be repeated for many different users of the online system. Because the method provides for a discount that becomes valid at the time the corresponding discount offer is displayed to a particular user, two users who are displayed the same variable-start discount offer at different times would receive discounts that become valid and invalid at different times. In other words, the same variable-start discount offer can be displayed 412 to a second user at a different time, which causes the online system to record 406 a different timestamp and generate 408 a different encoded timestamp.

The methods shown in FIGS. 3 and 4 were described with reference to a discount offer that provides a discount for an online purchase. However, in alternative embodiments, the same methods may also be applied to discount offers that provide a discount for in-person purchases at brick-and-mortar stores. In one embodiment, the merchant system 130 includes a server that communicates over the network 120 with the online system 140 and further includes a network of point-of-sale (POS) systems at one or more brick-and-mortar stores operated by the merchant. In this embodiment, the server sends 302, 402 the discount offer to the online system 140, and one of the POS systems processes the user's purchase and determines whether a discount should be applied. In addition, the discount code in this embodiment may be a bar code that can be displayed on the screen and scanned by one of the POS systems or a data item that the client device 110 can send to one of the POS systems via a communication technology such as near-field communication (NFC).

Pre-announced discount offers for brick-and-mortar stores may be subject to different location-based triggering conditions. In one embodiment, the discount offer module 230 sends 316 a notification about a merchant's pre-announced discount offer to the user if the online system 140 determines that the user is currently near a location corresponding to a brick-and-mortar store operated by the merchant (e.g., the distance between the user's location and the store's location is less than a threshold distance; the user's location is within a predefined geo-fence surrounding the store's location). For example, a pre-announced discount offer for a discount at BROOKS BROTHERS is displayed to a user, and the module 230 sends the user a notification about the pre-announced discount offer as the user is walking through a shopping mall containing a BROOKS BROTHERS store.

Variable-start discount offers for brick- and mortar stores may selected 404 and sent 410 in embodiments where the online system 140 can determine the location of the user when selecting 404 the variable-start discount offer along with other content items to display to the user. In one embodiment, the online system 140 determines, while selecting content items for display to the user (e.g., when populating the user's newsfeed), that the user is close to a brick-and-mortar store operated by merchant that has provided a variable-start discount offer (e.g., the distance between the user's location and the store's location is less than a threshold distance; the user's location is within a predefined geo-fence surrounding the store's location). Upon determining that the user is near the store, the discount offer module 230 selects 404 the variable start discount offer, records 406 a timestamp, generates 408 an encoded timestamp, and sends 410 the variable-start discount offer and the encoded timestamp 410 to the user's client device 110. In this embodiment, the encoded timestamp 410 may be a barcode or data item with the recorded timestamp encoded into it, and the POS system that scans the barcode or receives the data item extracts the recorded timestamp and determines whether the variable-start discount offer is still valid at the time the purchase is made. For example, suppose a user accesses the online system 140 on a smartphone while he or she is in a shopping mall containing a BROOKS BROTHERS store, and the user has adjusted his or her privacy settings in a manner that allows the online system 140 to determine the user's location when the user accesses the online system 140 (e.g., via a location sensor such as a GPS receiver on the smartphone). In this example, the discount offer module 230 may select 404 and send 410 a variable-start discount offer for BROOKS BROTHERS for display to the user as part of the user's newsfeed. In addition to the other elements shown in the example in FIG. 2C, the variable-start discount offer also may be displayed with a map or description of the location of the BROOKS BROTHERS store within the shopping mall.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:
1. A method comprising:
receiving a variable-start discount offer at an online system, the variable-start discount offer comprising an offer for a discount on a purchase at a merchant system and an offer duration specifying a length of a time period during which the discount is valid;
selecting the variable-start discount offer for display to a user of the online system;
recording a timestamp representing a time at which the variable-start discount offer is to be displayed to the user;
generating an encoded timestamp for delivery to the merchant system, the encoded timestamp having the recorded timestamp encoded therein, wherein the merchant system is configured to apply the discount to the purchase responsive to determining that the time elapsed between the recorded timestamp and the purchase is less than the offer duration;
receiving an indication from a client device associated with the user that the client device has accessed a merchant web page provided by the merchant system, wherein the merchant web page contains a tracking pixel for the online system, and wherein receiving the indication from the client device comprises receiving a request from the client device for data provided by the online system, the request sent by the client device responsive to the client device displaying the tracking pixel; and after receiving the indication, sending a notification including information about the variable-start discount offer to the client device for display to the user.

2. The method of claim 1, wherein generating the encoded timestamp comprises generating a discount code having the recorded timestamp encoded therein, and wherein sending the variable-start discount offer to the user comprises sending the encoded timestamp to the user as part of the variable-start discount offer.

3. The method of claim 1, wherein generating the encoded timestamp comprises generating a uniform resource locator for a web page operated by the merchant, the uniform resource locator having the recorded timestamp encoded therein, and wherein sending the variable-start discount offer to the user comprises sending the uniform resource locator to the user as part of the variable-start discount offer.

4. The method of claim 1, further comprising:
sending the encoded timestamp to the merchant system.

5. The method of claim 1, further comprising:
selecting the variable-start discount offer for display to a second user of the online system;
recording a second timestamp representing a time at which the variable-start discount offer is to be displayed to the second user, the second timestamp different from the first timestamp;
generating a second encoded timestamp for delivery to the merchant system, the second encoded timestamp having the second timestamp encoded therein, the second encoded timestamp different from the first encoded timestamp, wherein the merchant system is configured to apply the discount to a second purchase responsive to determining that the time elapsed between the second timestamp and the purchase is less than the offer duration; and
sending the variable-start discount offer for display to the second user.

6. The method of claim 1, wherein the recorded timestamp is recorded responsive to selecting the variable-start discount offer for display to the user.

7. The method of claim 1, wherein the recorded timestamp is recorded after receiving a request for an encoded timestamp from the client device.

8. The method of claim 1, further comprising:
decoding the encoded timestamp to extract the recorded timestamp;
determining a time elapsed between the recorded timestamp and the time of the purchase; and
responsive to determining that the time elapsed is less than the offer duration, applying the discount to the purchase.

9. A computer program product comprising a non-transitory computer-readable storage medium containing computer program code for:
receiving a variable-start discount offer at an online system, the variable-start discount offer comprising an offer for a discount on a purchase at a merchant system and an offer duration specifying a length of a time period during which the discount is valid;
selecting the variable-start discount offer for display to a user of the online system;
recording a timestamp representing a time at which the variable-start discount offer is to be displayed to the user;
generating an encoded timestamp for delivery to the merchant system, the encoded timestamp having the recorded timestamp encoded therein, wherein the merchant system is configured to apply the discount to the purchase responsive to determining that the time elapsed between the recorded timestamp and the purchase is less than the offer duration;
receiving an indication from a client device associated with the user that the client device has accessed a merchant web page provided by the merchant system, wherein the merchant web page contains a tracking pixel for the online system, and wherein receiving the indication from the client device comprises receiving a request from the client device for data provided by the online system, the request sent by the client device responsive to the client device displaying the tracking pixel; and
after receiving the indication, sending a notification including information about the variable-start discount offer to the client device for display to the user.

10. The computer program product of claim 9, wherein generating the encoded timestamp comprises generating a discount code having the recorded timestamp encoded therein, and wherein sending the variable-start discount offer to the user comprises sending the encoded timestamp to the user as part of the variable-start discount offer.

11. The computer program product of claim 9, wherein generating the encoded timestamp comprises generating a uniform resource locator for a web page operated by the merchant, the uniform resource locator having the recorded timestamp encoded therein, and wherein sending the variable-start discount offer to the user comprises sending the uniform resource locator to the user as part of the variable-start discount offer.

12. The computer program product of claim 9, wherein computer-readable storage medium further contains computer program code for:
selecting the variable-start discount offer for display to a second user of the online system;
recording a second timestamp representing a time at which the variable-start discount offer is to be displayed to the second user, the second timestamp different from the first timestamp;
generating a second encoded timestamp for delivery to the merchant system, the second encoded timestamp having the second timestamp encoded therein, the second encoded timestamp different from the first encoded timestamp, wherein the merchant system is configured to apply the discount to a second purchase responsive to determining that the time elapsed between the second timestamp and the purchase is less than the offer duration; and
sending the variable-start discount offer for display to the second user.

13. The computer program product of claim 9, wherein the recorded timestamp is recorded responsive to selecting the variable-start discount offer for display to the user.

14. The computer program product of claim 9, wherein the recorded timestamp is recorded after receiving a request for an encoded timestamp from the client device.

15. A method comprising:
receiving a variable-start discount offer at an online system, the variable-start discount offer comprising an offer for a discount on a purchase at a merchant system and an offer duration specifying a length of a time period during which the discount is valid;

selecting the variable-start discount offer for display to a user of the online system; and sending the variable-start discount offer to a client device for display to the user, wherein the client device is configured to:
- record a timestamp representing a time at which the variable-start discount offer was displayed to the user,
- generate an encoded timestamp for delivery to the merchant system, the encoded timestamp having the recorded timestamp encoded therein, wherein the merchant system is configured to apply the discount to the purchase responsive to determining that the time elapsed between the recorded timestamp and the purchase is less than the offer duration, and
- transmit an indication that the client device has accessed a merchant web page provided by the merchant system, wherein the merchant web page contains a tracking pixel for the online system, and wherein transmit the indication from the client device comprises transmit a request for data provided by the online system responsive to the client device displaying the tracking pixel; and sending a notification including information about the variable-start discount offer to the client device for display to the user.

16. The method of claim 15, wherein generating the encoded timestamp comprises generating a discount code having the recorded timestamp encoded therein, and wherein sending the variable-start discount offer to the user comprises sending the encoded timestamp to the user as part of the variable-start discount offer.

17. The method of claim 15, wherein generating the encoded timestamp comprises generating a uniform resource locator for a web page operated by the merchant, the uniform resource locator having the recorded timestamp encoded therein, and wherein sending the variable-start discount offer to the user comprises sending the uniform resource locator to the user as part of the variable-start discount offer.

18. The method of claim 15, further comprising:

selecting the variable-start discount offer for display to a second user of the online system;

sending the variable-start discount offer to a second client device for display to the second user, wherein the second client device is configured to:
- record a second timestamp representing a time at which the variable-start discount offer was displayed to the user, the second timestamp different from the first timestamp, and
- generate a second encoded timestamp for delivery to the merchant system, the second encoded timestamp having the second timestamp encoded therein, the second encoded timestamp different from the first encoded timestamp, wherein the merchant system is configured to apply the discount to a second purchase responsive to determining that the time elapsed between the recorded timestamp and the purchase is less than the offer duration.

19. The method of claim 15, further comprising:

recording a timestamp representing a time at which the variable-start discount offer was displayed to the user, and generating an encoded timestamp for delivery to the merchant system, the encoded timestamp having the recorded timestamp encoded therein, wherein the merchant system is configured to apply the discount to the purchase responsive to determining that the time elapsed between the recorded timestamp and the purchase is less than the offer duration.

20. The method of claim 15, further comprising:

decoding the encoded timestamp to extract the recorded timestamp;

determining a time elapsed between the recorded timestamp and the time of the purchase; and responsive to determining that the time elapsed is less than the offer duration, applying the discount to the purchase.

* * * * *